US012712466B2

(12) United States Patent
Gorski et al.

(10) Patent No.: US 12,712,466 B2
(45) Date of Patent: Aug. 18, 2026

(54) ELECTRICAL SYSTEM AND CONTROL METHOD

(71) Applicant: THERMO KING LLC, Minneapolis, MN (US)

(72) Inventors: Matthias Gorski, Bochum (DE); Eckardt Augenstein, Essen (DE)

(73) Assignee: THERMO KING LLC, Minneapolis, MN (US)

( * ) Notice: Subject to any disclaimer, the term of this patent is extended or adjusted under 35 U.S.C. 154(b) by 352 days.

(21) Appl. No.: 18/514,098

(22) Filed: Nov. 20, 2023

(65) Prior Publication Data

US 2024/0178762 A1 May 30, 2024

(30) Foreign Application Priority Data

Nov. 28, 2022 (EP) .................................... 22209924

(51) Int. Cl.
*H02M 1/44* (2007.01)
*H02M 7/04* (2006.01)

(52) U.S. Cl.
CPC ............... *H02M 7/04* (2013.01); *H02M 1/44* (2013.01)

(58) Field of Classification Search
CPC ................................. H02M 7/04; H02M 1/44
See application file for complete search history.

(56) References Cited

U.S. PATENT DOCUMENTS 4,053,820 A * 10/1977 Peterson .................. H02J 3/01 363/44
2015/0009727 A1* 1/2015 Zhou ....................... H02M 1/44 363/40
2021/0313876 A1* 10/2021 Kumar .................... H02M 1/44

FOREIGN PATENT DOCUMENTS

EP 2023476 A2 * 2/2009 ............ H02M 7/219
EP 3471260 4/2019
EP 3471260 A1 * 4/2019 .............. H02M 1/08

OTHER PUBLICATIONS

Extended European Search Report, issued in the corresponding EP patent application No. 22209924.4, dated Apr. 26, 2023, 9 pages.
Bilal et al., "Grid Parameter Estimation Using Model Predictive Direct Power Control", IEEE Transactions on Industry Applications, vol. 51, issue 6, Nov.-Dec. 2015, 9 pages.

* cited by examiner

*Primary Examiner* — Adolf D Berhane
(74) *Attorney, Agent, or Firm* — HSML P.C.

(57) ABSTRACT

An electrical system and method of operating the same is provided. The electrical system includes a passive filter, an active power converter, a first AC connecting bus extending between the active power converter and the passive filter, a second AC connecting bus extending between the passive filter and an AC network, a DC connecting bus extending between the active power converter and a DC network, and a monitoring arrangement. The method includes operating in a first mode and subsequently operating in a second mode. The first mode includes determining a plurality of parameters of an operating AC voltage of the AC network based on a monitored AC voltage on the first AC connecting bus. The second mode includes controlling the active power converter to convert a DC voltage received from the DC network into an AC voltage for supply to the AC network via the passive filter.

13 Claims, 3 Drawing Sheets

ELECTRICAL SYSTEM AND CONTROL METHOD

FIELD OF THE INVENTION

The present disclosure relates to an electrical system comprising an active power converter and a passive filter. The present disclosure also relates to a method of controlling an electrical system comprising an active power converter electrically coupled to a live AC network and a DC load network.

BACKGROUND OF THE INVENTION

It is known to derive power for driving a DC electrical load network from a live AC electrical network, such as a wide area synchronous grid. For this purpose, a DC load network may be coupled to a live AC network using an electrical system comprising an active power converter. Such an electrical system provides an interface between the live AC electrical network and the DC electrical load network.

In view of increasing electrification of industrial systems, it is desirable to provide an improved electrical system for providing an interface between a live AC electrical network and a DC electrical load network. In particular, it is desirable to provide an electrical system which is capable of providing a dynamic and robust interface between a live AC electrical network and a DC electrical load network.

SUMMARY OF THE INVENTION

According to a first aspect, there is provided a method of operating an electrical system comprising: a passive filter, an active power converter, a first AC connecting bus extending between the active power converter and the passive filter, a second AC connecting bus extending between the passive filter and an AC network, a DC connecting bus extending between the active power converter and a DC network, and a monitoring arrangement, the method comprising:

- operating in a first mode including:
  - monitoring an AC voltage on the first AC connecting bus using the monitoring arrangement; and
- determining a plurality of parameters of an operating AC voltage of the AC network based on the monitored AC voltage on the first AC connecting bus; and subsequently operating in a second mode including:
- controlling the active power converter to convert a DC voltage received from the DC network into an AC voltage for supply to the AC network via the passive filter, wherein controlling the active power converter is based on:
  - a mathematical model of a set of electrical characteristics of the passive filter; and
  - the plurality of parameters of the operating AC voltage of the AC network.

Each of the plurality of parameters of the operating AC voltage on the AC network may be selected from a group consisting of: a phase, a fundamental frequency, and a magnitude of the operating AC voltage on the AC network.

Operating in the second mode may include controlling a duty cycle, a switching frequency and/or a switching phase of the active power converter.

It may be that the plurality of parameters of the operating AC voltage on the AC network includes a fundamental frequency and a phase of the operating AC voltage on the AC network; and operating in the second mode includes: controlling the active power converter to match: a fundamental frequency and a phase of the AC voltage on the second AC connecting bus; with the fundamental frequency and the phase, respectively, of the operating AC voltage of the AC network.

It may be that the plurality of parameters of the operating AC voltage on the AC network includes a magnitude of the operating AC voltage on the AC network; and controlling the active power converter is further based on a magnitude of a voltage of the DC network.

Operating in the first mode may include: determining the plurality of parameters of the operating AC voltage of the AC network based on: the monitored AC voltage on the first AC connecting bus; and a mathematical model of the set of electrical characteristics of the passive filter.

Operating in the first mode may further include: controlling the active power converter to convert an AC voltage received from the AC network via the passive filter into a DC voltage for supply to the DC network.

The AC network may be an AC grid network.

According to a second aspect there is provided an electrical system comprising: a passive filter, an active power converter, a first AC connecting bus extending between the active power converter and the passive filter, a second AC connecting bus extending between the passive filter and an AC network, a DC connecting bus extending between the active power converter and a DC network, a monitoring arrangement configured to monitor an AC voltage on the first AC connecting bus, and a controller adapted to control the active power converter based on the monitored AC voltage on the first AC connecting bus.

The passive filter may include at least one reactive electrical component. The active power converter may include at least one active power switching component.

It may be that the controller is adapted to perform the method of any of the first aspect.

According to a third aspect, there is provided a software program comprising instructions which, when executed by the controller of the electrical system of the second aspect, cause the controller to execute the method of the first aspect.

According to a fourth aspect, there is provided a machine-readable medium having stored thereon the software program of the third aspect.

DETAILED DESCRIPTION

Figure 1A:
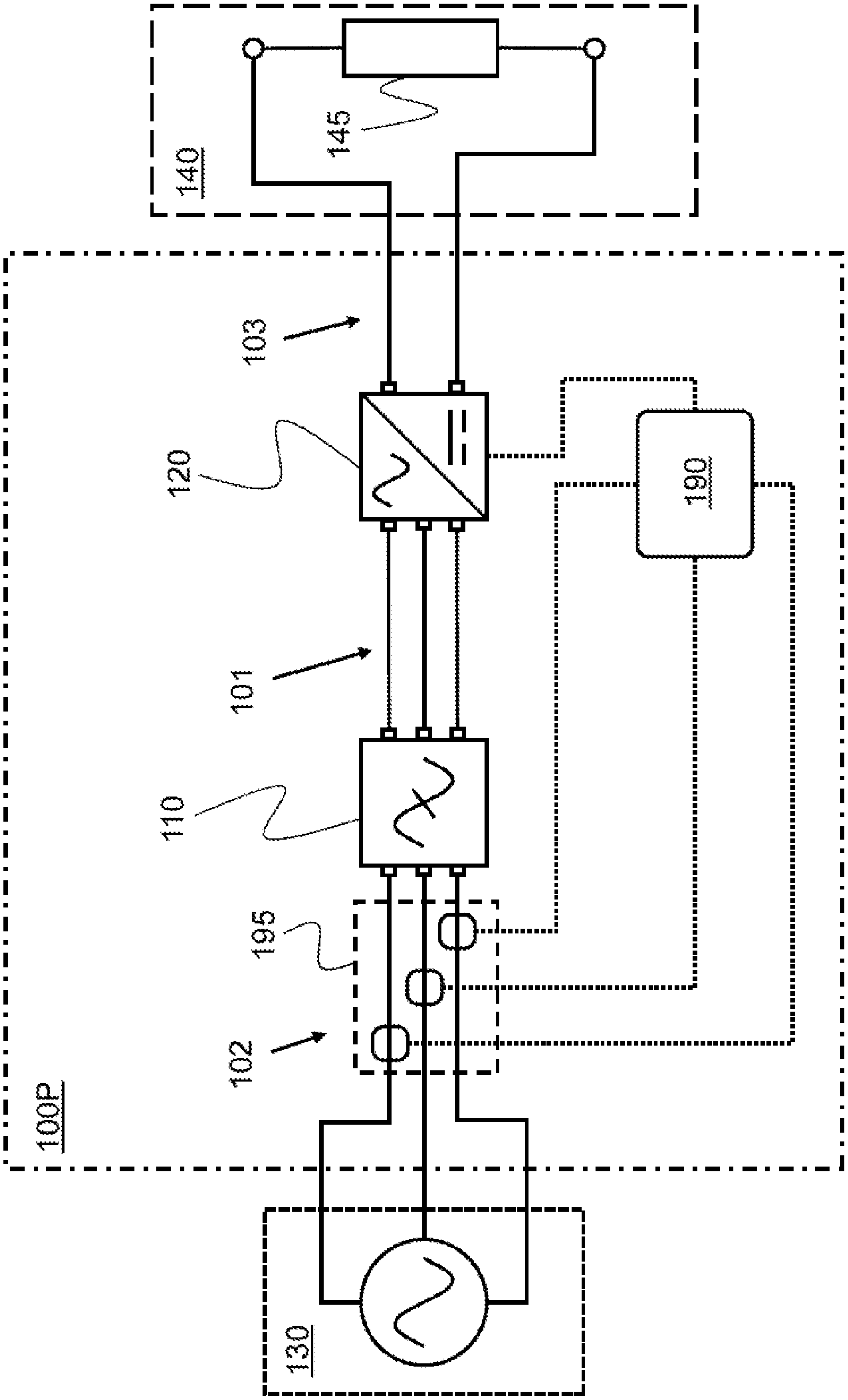
FIG. 1A shows, diagrammatically, an electrical system comprising an active power converter.

FIG. 1A diagrammatically shows an electrical system 100P comprising an active power converter 120 and a passive filter 110. The active power converter 120 is electrically coupled to both a live AC network 130 and a DC load network 140. The DC load network 140 comprises a DC load 145. The DC load 145 may include any suitable combination of a resistive load, a capacitive load and/or an inductive load. The active power converter 120 is coupled to the live AC network 130 via the passive filter 110. To provide the coupling between the active power converter 120 and the live AC network 130 via the passive filter 110, a first connecting AC bus 101 extends between the active power converter 120 and the passive filter 110 while a second connecting AC bus 102 extends between the passive filter 110 and the live AC network 130. A connecting DC bus 103 extends between the active power converter 120 and the DC load network 140. The electrical system 100P also includes a controller 190 configured to control the active power converter 120. The function of the electrical system 100P may be considered as to provide an electrical interface between the live AC network 130 and the DC load network 140.

The active power converter 120 is capable of converting an AC voltage received from the live AC network 130, via the passive filter 110, into a DC voltage for supply to the DC load network 140 (that is, the active power converter 120 is able to function as a rectifier). In addition, the active power converter 120 is capable of converting a DC voltage received from the DC load network 140 into an AC voltage for supply to the live AC network 130 via the passive filter 110 (that is, the active power converter 120 is able to function as an inverter). The active power converter 120 comprises one or more active power switching components. Each power switching component may include, for example, an insulated gate bipolar transistor (IGBT), a junction-gate field-effect transistor (JFET) and/or a power metal-oxide-semiconductor field-effect transistor (MOSFET). In particular, each power switching component may include a gate turn-off thyristor (GTO) and/or an integrated gate-commutated thyristor (ICGT).

The live AC network 130 may be, for instance, an AC grid network, such as a public or private electrical grid or an AC charging grid of the kind used to charge electric vehicles. In particular, the live AC network 130 may be a wide area synchronous grid. During a normal operation, the live AC network 130 supplies an AC voltage to the active power converter 120 via the passive filter 110. To achieve this, the controller 190 operates the active power converter 120 to perform an AC-DC procedure which includes controlling the active power converter 120 to convert the AC voltage received from the live AC network 130 via the passive filter 110 into a DC voltage for supply to the DC load network 140.

However, in some (abnormal or atypical) conditions, the active power converter 120 may be required to operate so as to perform an energetic recovery and thereby return electrical energy from the DC load network 140 to the live AC network 130 via the passive filter 110. In order to achieve this, the controller 190 operates the active power converter 120 to perform a DC-AC procedure which includes controlling the active power converter 120 to convert a DC voltage received from the DC load network 140 into an AC voltage for supply to the live AC network 130 via the passive filter 110.

The passive filter 110 is generally configured to remove noise from the AC voltage supplied to the live AC network 130 from the active power converter 120 during the DC-AC procedure. The passive filter 100 may also be generally configured to increase a degree to which a time-domain profile of the AC voltages supplied to the active power converter 120 during the AC-DC procedure or supplied to the live AC network 130 during the DC-AC procedure conform to a substantially sinusoidal time-domain profile. During the DC-AC procedure, the AC voltages output by the active power converter 120 to the first AC connecting bus 101 for supply to the live AC network 130 may have a substantially non-sinusoidal time-domain profile due to a switching function of the active power converter 120. For instance, the AC voltages output by the active power converter 120 to the first AC connecting bus 101 for supply to the live AC network 130 may have a substantially rectangular time-domain profile. The passive filter 110 is adapted to smooth the AC voltage provided by the active power converter 120 for subsequent supply to the live AC network 130. During the AC-DC procedure, it may be that the operation of the active power converter 120 is improved when the AC voltage supplied to the active power converter 120 does not contain a significant amount of noise and/or conforms to a substantially sinusoidal profile. The passive filter 110 may therefore enable more effective operation of the electrical system 100P as a whole.

For these purposes, the passive filter 110 may comprise at least one low-pass filter for blocking (or at least attenuating) high-frequency components of the AC voltage supplied through the passive filter 110 (e.g. high frequency components arising due to the switching function of the active power converter 120). In some examples, a self-inductance (or a mutual inductance) of an internal circuit of the passive filter 110 may be sufficient to block (or at least attenuate) high-frequency components of the AC voltage supplied through the passive filter 110 without a need to include a specifically adapted low-pass filter within the passive filter 110. In addition, the passive filter 110 may comprise a resonant tank circuit which is tuned to a relatively high resonant frequency, as will be appreciated by those skilled in the art. Additionally or alternatively, the passive filter 110 may also comprise a high-pass filter configured to block or attenuate any low frequency components (i.e. components below a lower frequency threshold) of the AC voltage supplied through the passive filter 110, such that the time-domain profile of the AC voltage supplied to the live AC network 130 or the active power converter 120 is primarily composed of frequency components between the lower-frequency threshold and the upper-frequency threshold. This may further increase the degree to which the time-domain profile of the AC voltage supplied to the live AC network 130 or the active power converter 120 conforms to a substantially sinusoidal profile. As will be appreciated by those of ordinary skill in the art, equivalent functionality can be achieved through the use of a band pass filter, configured with a suitable pass band, for the passive filter 110.

To these ends, the passive filter 110 may include at least one reactive electrical component such as an inductor or a capacitor. In particular, the passive filter may include a plurality of reactive electrical components. The plurality of reactive electrical components may be arranged in the form of an L topology, a T topology or a $\pi$ topology.

In FIG. 1A, the live AC network 130 is shown as being a polyphase (i.e. three-phase) AC network 130 and the first connecting AC bus 101 includes a plurality of (i.e. three) distinct first AC channels, each first AC channel being configured to conduct a respective phase of electrical power between the active power converter 120 and the passive filter 110. Similarly, the second connecting AC bus 102 includes a plurality of (i.e. three) distinct second AC channels, each second AC channel being configured to conduct a respective phase of electrical power between the live AC network 130 and the passive filter 110. Each phase of the live AC network 130 has an operating AC voltage characterised by a magnitude, a frequency and a phase.

The electrical system 100P also includes a monitoring arrangement 195. The monitoring arrangement 195 is configured to monitor a voltage on the second AC connecting bus 102. If the live AC network 130 is a polyphase (i.e. three-phase) AC network 130, the monitoring arrangement 195 may have a star or triangle arrangement to monitor at least two voltages of the second AC connecting bus 102, the two voltages being measured between pairs of the second AC channels of the second AC connecting bus 102. The monitoring arrangement 195 is in data communication with the controller 190 via a plurality of connecting cables. The controller 190 is generally adapted to control the active power converter 120 based on the voltages on the second AC connecting bus 102. During the DC-AC procedure, the controller 190 is therefore configured to control the active power converter 120 based on the voltages provided to the live AC network 130 as directly monitored by the monitoring arrangement 195. In particular, to perform the DC-AC procedure, the controller 190 is configured to control the active power converter 120 so as to ensure that a frequency and a phase, respectively, of the AC voltages supplied to the live AC network 130 (through the second connecting AC bus 102) correspond to a frequency and a phase of the operating voltages of the live AC network 130. The controller 190 may control a switching frequency and/or a switching phase of the active power converter 120 so as to control the frequency and phase of the AC voltages supplied to the live AC network 130.

Figure 1B:
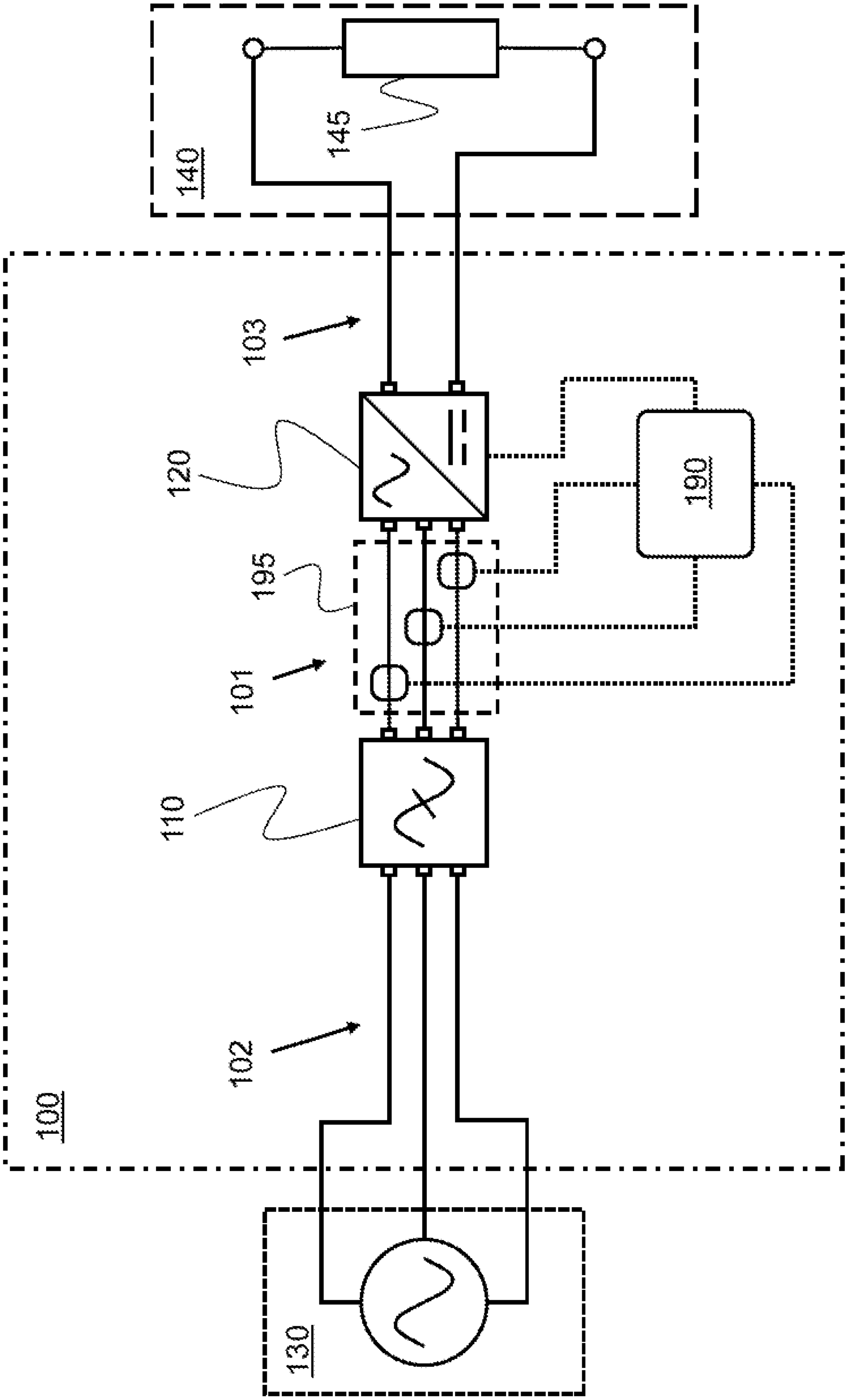
FIG. 1B shows, diagrammatically, an example electrical system comprising an active power converter in accordance with the present disclosure.

FIG. 1B diagrammatically shows an example electrical system 100 in accordance with the present disclosure. The example electrical system 100 has some similarities with the electrical system 100P described above with reference to FIG. 1A, with like reference signs indicating common or similar features. The live AC network 130 is shown as being a polyphase (i.e. three-phase) AC network 130 in the example of FIG. 1B. However, the present disclosure anticipates that the live AC network 130 may be a monophase AC network 130. If so, each of the first connecting AC bus 101 and the second connecting AC bus 102 has only a single AC channel.

In contrast to the electrical system 100P, the monitoring arrangement 195 is configured to monitor a voltage on the first AC connecting bus 101. If the live AC network 130 is a polyphase (i.e. three-phase) AC network 130, the monitoring arrangement 195 may have a star or triangle arrangement to monitor at least two voltages of the first AC connecting bus 101, the two voltages being measured between pairs of the first AC channels of the first AC connecting bus 101. As described in further detail below, the controller 190 is generally adapted to control the active power converter 120 based on the voltage on the first AC connecting bus 101 as monitored by the monitoring arrangement 150. As a result, the connecting cables between the monitoring arrangement 195 and the controller 190, together with any associated shielding, are not required to extend beyond the passive filter 110. This reduces an installation size and weight of the electrical system 100, as well as reducing an amount of material required to manufacture and assemble the electrical system 100. In addition, the reduction in length of the connecting cables may enable easier compliance with industrial regulations, such as electromagnetic compatibility (EMC) regulations.

As described above in respect of the electrical system 100P, the example electrical system 100 also includes a controller 190 configured to control the active power converter 120 based on the voltages monitored by the monitoring arrangement 195. However, due to the difference in the location of the monitoring arrangement 195 between FIGS. 1A and 1B, a method of controlling the active power converter 120 in the electrical system 100 of FIG. 1 performed by the controller 190 differs. Because the monitoring arrangement 195 is configured to monitor the voltage on the first AC connecting bus 101, the voltage monitored by the monitoring arrangement during the DC-AC procedure performed by the active power converter 120 does not necessarily correspond to the voltage supplied to the live AC network 130 through the second AC connecting bus 102.

Instead, in the example electrical system 100, the voltages monitored by the monitoring arrangement 195 during the DC-AC procedure corresponds to the AC voltages output by the active power converter 120 to the first AC connecting bus 101 for supply to the live AC network 130 via the passive filter 110. As discussed above with respect to FIG. 1A, the AC voltages output by the active power converter 120 have a substantially non-sinusoidal time-domain profile (e.g. a rectangular time-domain profile) due to a switching function of the active power converter 120. Consequently, unlike the previously-considered electrical system 100P, the controller 190 cannot control the active power converter 120 based on the voltages as directly monitored by the monitoring arrangement 195 to reliably ensure that a fundamental frequency (that is, the AC characteristic oscillating frequency) and a phase, respectively, of the AC voltages supplied to the live AC network 130 through the second connecting AC bus 102 correspond to a fundamental frequency and a phase of the operating voltages of the live AC network 130. Accordingly, an alternative method of operating the active power converter 120, based on the monitored voltage on the first AC connecting bus 101, is desired.

Figure 2:
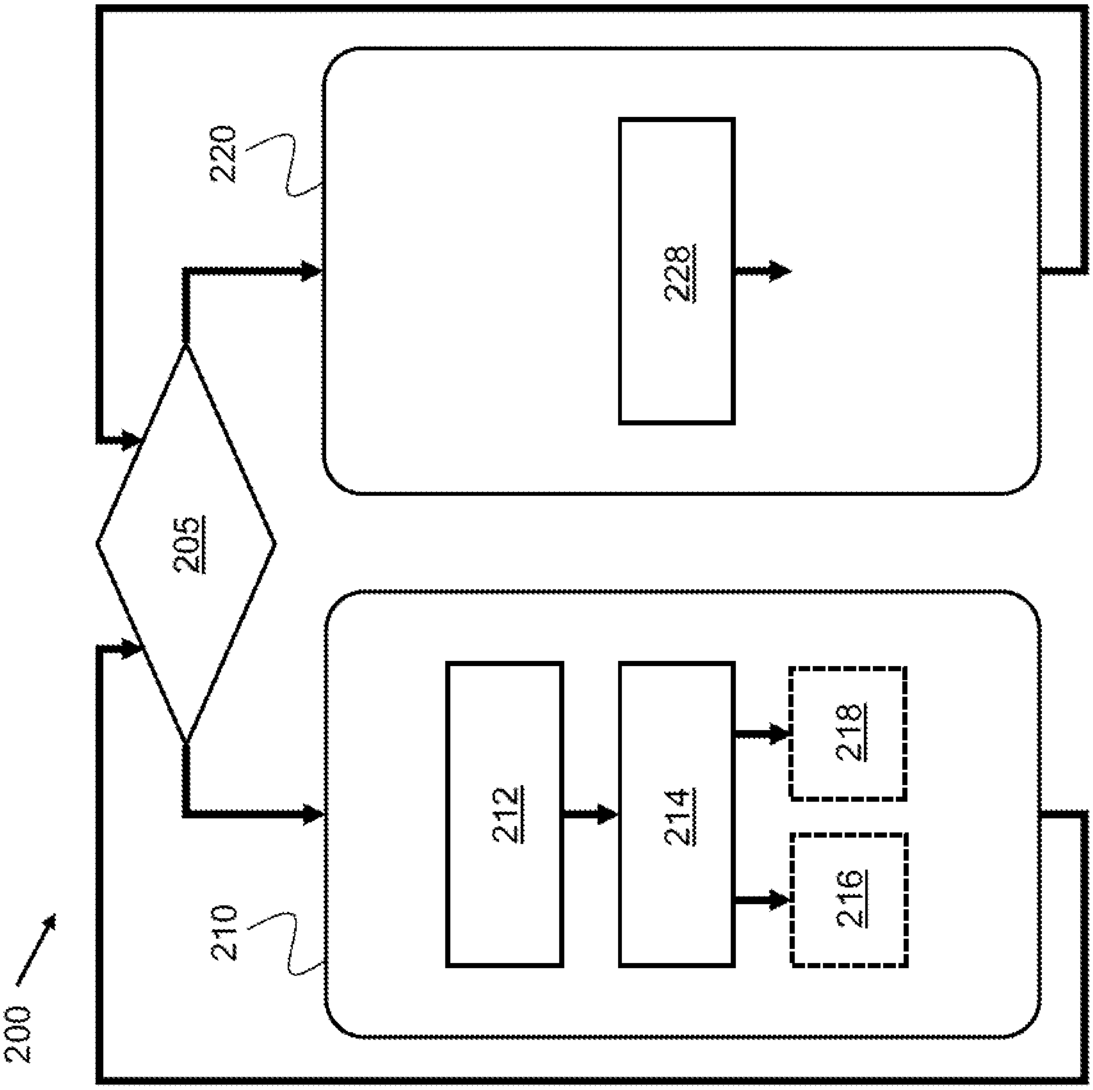
FIG. 2 is a flowchart which shows a method of controlling the active power converter shown in FIG. 1B.

FIG. 2 is a flowchart which shows a method 200 of operating the electrical system 100 described above with respect to FIG. 1B.

The method 200 includes operating the active power converter 120 in a first mode at block 210 and/or operating the electrical system 100 in a second mode at block 220. The method 200 may generally commence at block 210 (that is, in the first mode) or at a block 205. Block 205 includes determining whether to operate in the second mode 220 or in the first mode 210. The method 200 therefore may include switching from the second mode 220 to the first mode 210 (or from the first mode 210 to the second mode 220) as a result of the determination made in block 205.

Specifically, block 205 includes determining whether the DC load network 140 is in a "load dump" (or a "load shedding") condition, which may occur, for example when the DC load 145 is electrically decoupled from the other components of the DC load network 140 in use. When the DC load 145 is electrically decoupled from the other components of the DC load network 140, an excess voltage condition could arise within the DC load network 140. An excess voltage condition occurs when the voltage of the DC load network 140 exceeds a nominal or a rated voltage of the DC load network 140. Accordingly, it may be necessary to dynamically dissipate electrical energy from the DC load network 140 to the live AC network 130 so as to avoid such an excess voltage condition.

If (at block 205) it is determined that the DC load network 140 is in a load dump condition, the method 200 proceeds to block 220 to operate the electrical system 100 in the second mode. Otherwise, if (at block 205) it is determined that the DC load network 140 is not in a load dump condition, the method 200 proceeds to block 210 to operate the active power converter 120 in the first mode. During operation of the active power converter 120, it will typically be that it is determined (at block 205) that the DC load network 140 is not in a load dump condition and therefore the active power converter 120 is operated in the first mode.

In the first mode (at block 210), the active power converter 120 may be generally operated to either transfer electrical energy from the live AC network 130 to the DC load network 140 to drive the DC load network 140 or so that electrical energy is not transferred from the live AC network 130 to the DC load network 140. The first mode may therefore be considered to include a dormant procedure and/or an AC-DC procedure. Accordingly, the first mode may be referred to as a normal mode. The dormant procedure includes a process 212, a process 214 and a process 216, whereas the AC-DC procedure includes the process 212, the process 214 and a process 218. The first mode includes determining whether to perform process 216 or process 218 after performance of processes 212 and 214. The first mode may include opting to perform process 218 instead of process 216 in response to a demand to provide electrical energy to the DC load network 140 to drive the DC load network 140. Conversely, the first mode may include opting to perform process 216 instead of process 218 in response to an absence of a demand to provide electrical energy to the DC load network 140. After execution of each of processes 212-214 and optionally processes 216 or 218, the method 200 returns to block 205 as shown in FIG. 2.

Process 212 comprises monitoring the voltages on the first AC connecting bus 101 using the monitoring arrangement 195. Process 214 includes determining a plurality of parameters of the associated operating voltages of the live AC network 130 based on the monitored voltages on the first AC connecting bus 101. The plurality of parameters may include a phase, a fundamental frequency and a magnitude (e.g. peak magnitude or peak amplitude) of the associated operating voltages of the live AC network 130. The monitoring arrangement 195 generally includes appropriate voltage monitoring circuitry adapted to monitor the voltages on the first AC connecting bus 101. The monitoring arrangement 195 may include a plurality of phase-locked loop (PLL) devices, each of which is configured to directly observe a phase of a respective voltage on the first AC connecting bus 101.

At any given point in time, the magnitude of the operating voltages on the first AC connecting bus 101 may be monitored using the voltage monitoring circuitry of the monitoring arrangement 195. The phase of each voltage on the first AC connecting bus 101 may be determined using the phase-locked loop (PLL) devices discussed above. In addition, the fundamental frequency of each monitored voltage on the first AC connecting bus 101 may be determined by application of a discrete Fourier transform (DFT) algorithm such as a fast Fourier transform (FFT) to the time-domain magnitudes of the monitored voltages on the first AC connecting bus 101. Further, the phase of each monitored voltage on the first AC connecting bus 101 may in turn be determined by analysing the time-domain magnitudes of the monitored voltages on the first AC connecting bus 101 using electronic clocks or the like.

For any given set of electrical characteristics of the passive filter 110, the fundamental frequency of the voltages on the first AC connecting bus 101 and the fundamental frequency of the associated voltages on the second AC connecting bus 102 may be approximately equal. In other words, the passive filter 110 does not cause any substantial difference in the fundamental frequency of the voltages on the first AC connecting bus 101 and the fundamental frequency of the associated voltages on the second AC connecting bus 102. Therefore, in the first mode, the fundamental frequency of the operating voltages of the live AC network may generally be assumed to be approximately equal to the fundamental frequency of the associated voltages on the first AC connecting bus 101 as monitored using the monitoring arrangement 195.

It may be that a set of electrical characteristics of the passive filter 110 are such that, in the first mode, there is not a significant difference between the phase of the voltages on the first AC connecting bus 101 and the phase of the associated voltages on the second AC connecting bus 102 due to the presence of the passive filter 110 therebetween (i.e. the passive filter 110 does not give rise to a significant phase shift). If so, the phase of the operating voltages of the live AC network 130 may be assumed to be approximately equal to the phase of the associated voltages on the first AC connecting bus 101 as monitored using the monitoring arrangement 195.

Further, it may be that the set of electrical characteristics of the passive filter 110 are such that, in the first mode, there is not a significant difference between the magnitude of the voltages on the first AC connecting bus 101 and the magnitude of the associated voltages on the second AC connecting bus 102 due to the presence of the passive filter 110 (i.e. there is not a significant voltage drop across the passive filter 110). If so, the magnitude of the operating voltages of the live AC network 130 may be assumed to be approximately equal to the magnitude of the associated voltages on the first AC connecting bus 101 as monitored using the monitoring arrangement 195. This may occur when the passive filter 110 has a relatively low or negligible effective parasitic resistance.

Accordingly, in process 214, it may be possible to determine the parameter(s) of the operating voltages of the live AC network 130 based only on the monitored parameter(s) of the associated voltages on the first AC connecting bus 101.

On the other hand, it may be that the set of electrical characteristics of the passive filter 110 are such that, in use, there is a significant difference between the magnitude and/or the phase of the voltages on the first AC connecting bus 101 and the magnitude and/or the phase of the associated voltages on the second AC connecting bus 102 due to the presence of the passive filter 110. If so, it may only be possible to accurately determine the parameter(s) of the operating voltages of the live AC network 130 based on both the monitored parameter(s) of the associated voltages on the first AC connecting bus 101 and a mathematical model of the set of electrical characteristics of the passive filter 110 in process 214.

The mathematical model may be an analytical model or a numerical model of the electrical characteristics of the passive filter 110. Suitable types of mathematical model will be apparent to those skilled in the art. However, if the mathematical model is an analytical model, the mathematical model may include a transfer function (or an inverse transfer function) which models the electrical output of the passive filter 110 for any given electrical input to the passive filter 110 (or vice versa). If the mathematical model is a numerical model, the mathematical model may be in the form of a look-up table or similar which relates the electrical output of the passive filter 110 to a given electrical input to the passive filter 110 or vice versa. The look-up table may include a phase-shift, a fundamental frequency-change and/or a magnitude-change applied by the passive filter 110 to an AC voltage passing through the passive filter 110. The mathematical model may be based on the electrical properties of the passive filter 110, such as an effective capacitance, an effective inductance and an effective resistance (e.g. a parasitic resistance) of the passive filter 110 together with the electrical topology of the passive filter 110 itself.

The determined parameter(s) of the operating voltages of the live AC network 130 are not further used in the first mode 210, but the determined parameter(s) of the operating voltages of the live AC network 130 may be useful for subsequent operation in the second mode 220, as is described in further detail below.

Process 216 includes controlling the active power converter 120 so that a DC voltage is not supplied to the DC load network 140. Control of the active power converter 120 to achieve this may include opening one or more active power switching components of the active power converter 120 and thereby preventing supply of electrical energy to the DC load network 140 from the live AC network 130 (and vice versa).

Process 218 includes controlling the active power converter 120 to convert an AC voltage received from the live AC network 130 via the passive filter 110 into a DC voltage for supply to the DC load network 140. Control of the active power converter 120 to achieve this includes controlling the active power converter 120 to function as a rectifier (and, optionally, a voltage-multiplying rectifier) and thereby driving the DC load network 140 as required.

Following operation in the first mode (at block 210), the method 200 includes switching (at block 205) from the first mode to subsequently operate in the second mode (at block 220). In the second mode, the active power converter 120 is generally operated to transfer electrical energy from the DC load network 140 to the live AC network 130 and thereby prevent an excess voltage condition from arising in the DC load network 140 during, for example, a load dump condition as described above. The second mode may therefore be considered to include a DC-AC procedure. Accordingly, the first mode may be referred to as an abnormal mode. The DC-AC procedure includes a process 228. After execution of the process 228, the method 200 returns to block 205 as shown in FIG. 2.

In the second mode, the voltages on the first AC connecting bus 101 do not have substantially sinusoidal time-domain profiles. In particular, during the DC-AC procedure, the AC voltages output by the active power converter 120 to the first AC connecting bus 101 for supply to the live AC network 130 may have a substantially rectangular time-domain profile as discussed above. The set of electrical characteristics of the passive filter 110 are such that, in use, the passive filter 110 smooths the AC voltages output by the active power converter 120 to the first AC connecting bus 101 and thereby increase the conformity of the AC voltages on the second AC connecting bus 102 with a sinusoidal time-domain profile for supply to the live AC network 130. Accordingly, the set of electrical characteristics of the passive filter 110 are such that, in the second mode, the voltages on the first AC connecting bus 101 do not generally correspond to the voltages on the second AC connecting bus 102. In particular, the set of electrical characteristics of the passive filter 110 are such that, in the second mode, there may be a significant difference between the magnitude and/or the phase of the voltages on the first AC connecting bus 101 and the magnitude and/or the phase of the associated voltages on the second AC connecting bus 102 due to the presence of the passive filter 110 therebetween.

Process 228 includes controlling the active power converter 120 to convert a DC voltage received from the DC load network 140 into an AC voltage for supply to the live AC network 130 via the passive filter 110. Control of the active power converter 120 to achieve this includes controlling the active power converter 120 to function as an inverter and thereby dynamically dissipate electrical energy from the DC load network 140 to the live AC network 130 so as to avoid the possibility of an excess voltage condition arising in the DC load network 140. During process 228, control of the active power converter 120 is based on at least: a mathematical model of a set of electrical characteristics of the passive filter 110, and a plurality of parameters of the operating AC voltage of the live AC network 130.

The plurality of parameters of the operating AC voltages of the live AC network 130 are the plurality of parameters of the operating AC voltages of the live AC network 130 as determined in process 214 when the electrical system 100 was last operated in the first mode. Consequently, the plurality of parameters of the operating AC voltages of the live AC network 130 may include a phase, a fundamental frequency and/or a magnitude of the associated operating voltages of the live AC network 130 as applicable.

Control of the active power converter 120 in process 228 includes controlling a duty cycle, a switching frequency and/or a switching phase of the active power converter 120 as required. By controlling these variables, the phase, fundamental frequency and/or the magnitude of the voltages on the first AC connecting bus 101 may be directly controlled. Although, as discussed above, the action of the passive filter 110 may result in differences in the phase and/or the magnitude of the voltages between the first AC connecting bus 101 and the second AC connecting bus 102, there remains a (complex) relationship between the voltages on the respective buses 101, 102 defined by the set of electrical characteristics of the passive filter 110. Therefore, by controlling the above variables, the phase, fundamental frequency and/or the magnitude of the voltages on the second AC connecting bus 102 may be indirectly controlled. It follows that the phase, fundamental frequency and/or the magnitude of the voltages returned to the live AC network 130 may be controlled in this way.

The mathematical model upon which is control of the active power converter 120 is based in process 228 models the complex relationship between the voltages on the respective buses 101, 102 due to the presence of the passive filter 110 therebetween. Basing control of the active power converter 120 on the mathematical model in process 228 enables the voltages on the second AC connecting bus 102 to be controlled so as to target a specified phase and/or a specified magnitude. Like the mathematical model described above with respect to process 214, the mathematical model employed in process 228 may be an analytical model or a numerical model of the electrical characteristics of the passive filter 110. Suitable types of mathematical models will be apparent to those skilled in the art. However, if the mathematical model is an analytical model, the mathematical model may include a transfer function (or an inverse transfer function) which models the electrical output of the passive filter 110 for any given electrical input to the passive filter 110 (or vice versa). If the mathematical model is a numerical model, the mathematical model may be in the form of a look-up table or similar which relates the electrical output of the passive filter 110 to a given electrical input to the passive filter 110 or vice versa.

For effective operation of the active power converter 120 in the second mode, process 228 includes controlling the fundamental frequency and the phase of the AC voltages on the second AC connecting bus 102 to match the fundamental frequency and the phase, respectively, of the operating AC voltages of the live AC network 130. This is associated with more effective dynamic dissipation of electrical energy from the DC load network 140 to the live AC network 130 in the second mode.

For similar reasons, process 228 may include controlling the active power converter 120 to ensure that the magnitude of the AC voltages on the second connecting bus 102 (compared to the magnitude of the operating AC voltages of the live AC network 130) is sufficient to effectively drive electrical current from the second connecting bus 102 to the live AC network 130 and thereby ensure that electrical power is supplied from the second AC connecting bus 102 to the live AC network 130. If so, control of the active power converter 120 in process 228 is further based on a magnitude of a voltage of the DC network 140. The magnitude of the voltage of the DC network 140 may be monitored directly by the active power converter 120 or by a dedicated additional monitoring arrangement (not shown).

Figure 3:
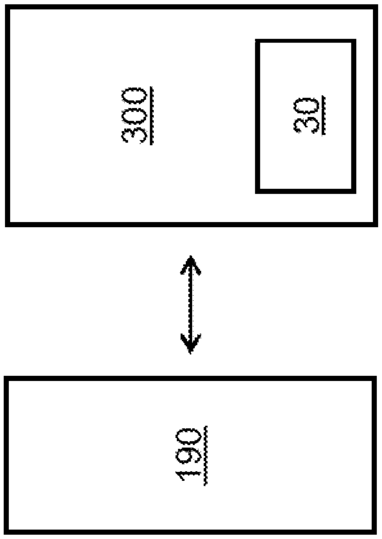
FIG. 3 shows, symbolically, a machine-readable medium having stored thereon a software program which, when executed by a controller, causes the controller to perform the method of FIG. 2.

FIG. 3 symbolically shows a machine-readable medium 300 having stored thereon a software program 30 (e.g. a computer program 30) comprising instructions which, when executed by the controller 190 provided to an electrical system in accordance with the example electrical system 100 as described above with reference to FIG. 1B, cause the controller 190 to execute the method 200 described above with reference to FIG. 2.

The controller(s) described herein may comprise a processor. The controller and/or the processor may comprise any suitable circuity to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller or the processor may comprise or be in communication with one or more memories that store that data described herein, and/or that store machine readable instructions (e.g. software) for performing the processes and functions described herein (e.g. determinations of parameters and execution of control routines). The memory may be any suitable non-transitory computer readable storage medium, data storage device or devices, and may comprise a hard disk and/or solid state memory (such as flash memory). In some examples, the computer readable instructions may be transferred to the memory via a wireless signal or via a wired signal. The memory may be permanent non-removable memory or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

The invention claimed is:

1. A method of operating an electrical system comprising: a passive filter, an active power converter, a first AC connecting bus extending between the active power converter and the passive filter, a second AC connecting bus extending between the passive filter and an AC network, a DC connecting bus extending between the active power converter and a DC network, and a monitoring arrangement, the method comprising:
- operating in a first mode including:
  - monitoring an AC voltage on the first AC connecting bus using the monitoring arrangement; and
  - determining a plurality of parameters of an operating AC voltage of the AC network based on the monitored AC voltage on the first AC connecting bus; and
- subsequently operating in a second mode including:
  - controlling the active power converter to convert a DC voltage received from the DC network into an AC voltage for supply to the AC network via the passive filter, wherein controlling the active power converter is based on:
    - a mathematical model of a set of electrical characteristics of the passive filter; and
    - the plurality of parameters of the operating AC voltage of the AC network.

2. The method of claim 1, wherein each of the plurality of parameters of the operating AC voltage on the AC network is selected from a group consisting of: a phase, a fundamental frequency, and a magnitude of the operating AC voltage on the AC network.

3. The method of claim 1, wherein:
- subsequently operating in the second mode includes:
  - controlling a duty cycle, a switching frequency and/or a switching phase of the active power converter.

4. The method of claim 1, wherein:
- the plurality of parameters of the operating AC voltage on the AC network includes a fundamental frequency and a phase of the operating AC voltage on the AC network; and
- operating in the second mode includes:
  - controlling the active power converter to match:
    - a fundamental frequency and a phase of the AC voltage on the second AC connecting bus; with
    - the fundamental frequency and the phase, respectively, of the operating AC voltage of the AC network.

5. The method of claim 1, wherein:
- the plurality of parameters of the operating AC voltage on the AC network includes a magnitude of the operating AC voltage on the AC network; and
  - controlling the active power converter is further based on:
    - a magnitude of a voltage of the DC network.

6. The method of claim 1, wherein:
- operating in the first mode includes:
  - determining the plurality of parameters of the operating AC voltage of the AC network based on:
    - the monitored AC voltage on the first AC connecting bus; and
    - a mathematical model of the set of electrical characteristics of the passive filter.

7. The method of claim 1, wherein:
- operating in the first mode further includes:
  - controlling the active power converter to convert an AC voltage received from the AC network via the passive filter into a DC voltage for supply to the DC network.

8. The method of claim 1, wherein the AC network is an AC grid network.

9. An electrical system comprising: a passive filter, an active power converter, a first AC connecting bus extending between the active power converter and the passive filter, a second AC connecting bus extending between the passive filter and an AC network, a DC connecting bus extending between the active power converter and a DC network, a monitoring arrangement configured to monitor an AC voltage on the first AC connecting bus, and a controller adapted to control the active power converter based on the monitored AC voltage on the first AC connecting bus;

wherein the controller is adapted to perform a method of operating the electrical system, the method comprising:

operating in a first mode including:

monitoring an AC voltage on the first AC connecting bus using the monitoring arrangement; and determining a plurality of parameters of an operating AC voltage of the AC network based on the monitored AC voltage on the first AC connecting bus; and subsequently operating in a second mode including:

controlling the active power converter to convert a DC voltage received from the DC network into an AC voltage for supply to the AC network via the passive filter, wherein controlling the active power converter is based on:

a mathematical model of a set of electrical characteristics of the passive filter; and the plurality of parameters of the operating AC voltage of the AC network.

10. The electrical system of claim 9, wherein the passive filter includes at least one reactive electrical component.

11. The electrical system of claim 9, wherein the active power converter includes at least one active power switching component.

12. A software program comprising instructions which, when executed by the controller of the electrical system of claim 9, cause the controller to execute a method of operating the electrical system, the method comprising:

operating in a first mode including:

monitoring an AC voltage on the first AC connecting bus using the monitoring arrangement; and determining a plurality of parameters of an operating AC voltage of the AC network based on the monitored AC voltage on the first AC connecting bus; and subsequently operating in a second mode including:

controlling the active power converter to convert a DC voltage received from the DC network into an AC voltage for supply to the AC network via the passive filter, wherein controlling the active power converter is based on:

a mathematical model of a set of electrical characteristics of the passive filter; and the plurality of parameters of the operating AC voltage of the AC network.

13. A machine-readable medium having stored thereon the software program of claim 12.

* * * * *